July 20, 1926.
J. S. FLUOR
ATMOSPHERIC COOLING TOWER TROUGH
Original Filed March 22, 1923
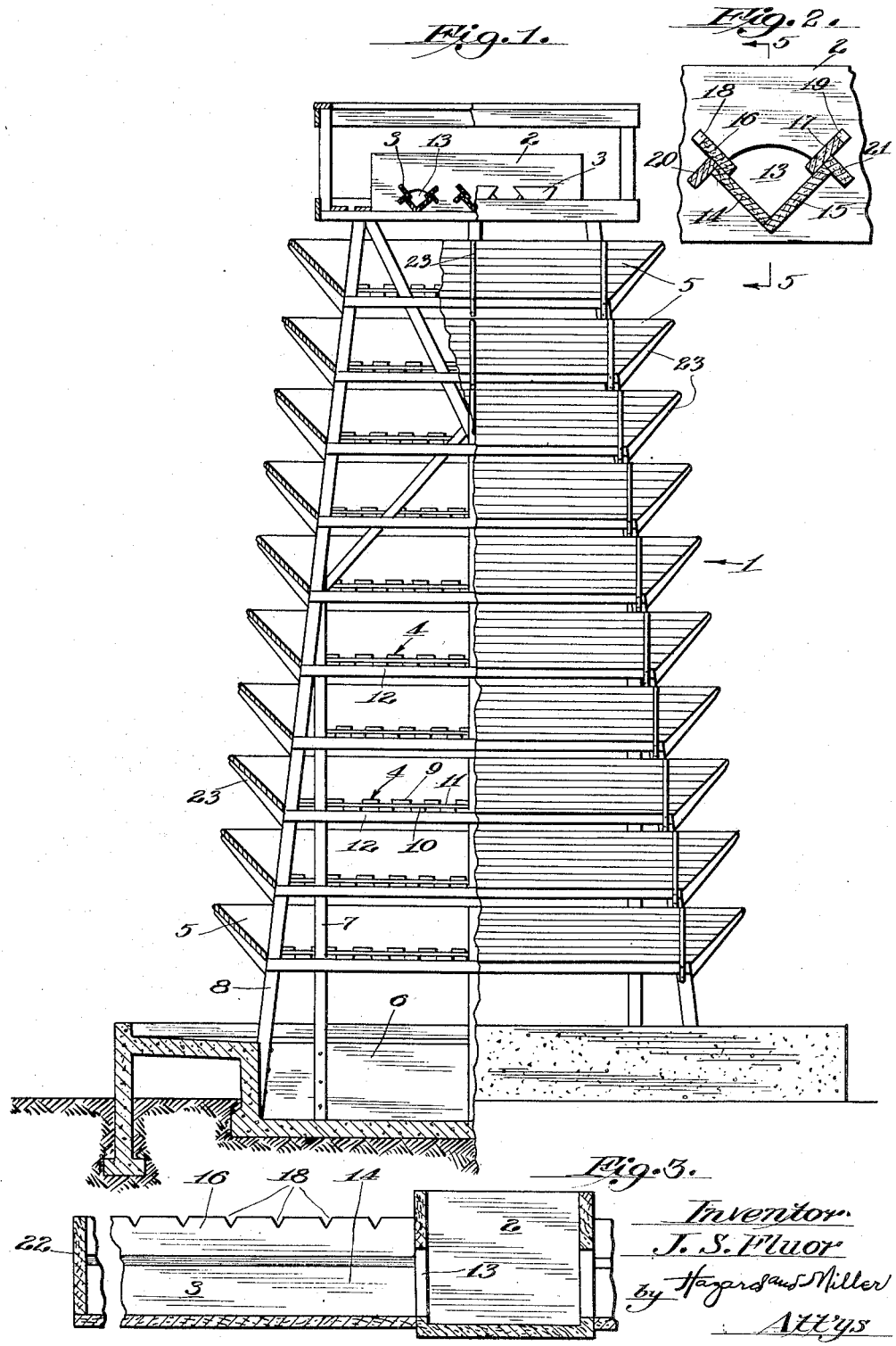

Patented July 20, 1926.

1,593,252

UNITED STATES PATENT OFFICE.

JOHN SIMON FLUOR, OF SANTA ANA, CALIFORNIA.

ATMOSPHERIC COOLING-TOWER TROUGH.

Original application filed March 22, 1923, Serial No. 626,846. Divided and this application filed September 24, 1924. Serial No. 739,733.

This invention relates to atmospheric cooling towers, and consists of the novel features herein shown, described and claimed.

The present application is a division of my companion application for atmospheric cooling towers filed March 22, 1923, Serial No. 626,846.

As set up in the companion application, it is an object of these inventions to provide a simplified and highly efficient means for taking the heat out of water which may have been used as a cooling medium in contact with coils or cylinders, such as the cylinders of engines, pumps or the like, and which water is to be further used in a cyclical or other manner.

Another object is to provide improved distributing troughs.

A feature of my improved distributing trough is in having the water as it pours over the edge of the trough fall in a film or spray before it impinges on the apron, the apron spreading the water laterally.

Another feature of the trough is having extension boards which may be placed on a V-shaped trough, the extension boards having a part extending upwardly in the same alinement as the side of the troughs and having aprons attached at substantially right angles to the extension boards, these aprons resting over the edge of the trough and holding the extension boards in position. Therefore as the water fills the trough and flows up on the extension boards, in flowing over the edge of these boards it passes through the air in a thin film before contacting with the aprons.

Other objects and advantages will appear from the drawings and specification.

The drawings illustrate the construction and operation of an atmospheric cooling tower embodying the principles of my invention.

Figure 1 is a view partly in elevation and partly in section of the atmospheric cooling tower.

Fig. 2 is a cross section through one of the distributing troughs.

Fig. 3 is a fragmentary vertical sectional detail on the line 5—5 of Fig. 2 and looking in the direction indicated by the arrows.

The details of construction and operation shown in the drawings are as follows:

The tower 1 is provided at its top with a receiving and distributing box 2 from which distributing troughs 3 extend laterally to deliver water or other liquid overflowing therefrom and permit it to descend into contact with successive tiers of water trays 4 having louvres 5 and the water being finally permitted to collect in a reservoir or pool 6 at the bottom of the tower.

It being understood that cooling towers have heretofore commonly been so constructed as to have substantially a uniform diameter throughout their vertical extent, it is an important feature of my cooling tower to so construct a tower that its diameter shall constantly increase from the top downwardly, and for this purpose I use vertical posts 7 extending part way from the reservoir upwardly and inclined posts 8 uniting with the posts 7 and extending from the reservoir to the top of the tower and the trays 4 and louvres 5 are mounted upon the inclined posts 8.

The trays 4 are made of slats 9 and 10 secured in staggered relation to end pieces 11 and the trays are mounted upon horizontal bars 12 mounted upon the posts 7 and 8 and the louvres 5 extend outwardly and upwardly from the ends of the horizontal bars 12.

The water is pumped into the receiving and distributing box 2 and runs outwardly and overflows from the distributing troughs 3 and falls downwardly upon the trays 4 and from tray to tray and the air passes upwardly around the falling water and cools the water.

The details of the receiving and distributing box 2 and the distributing troughs 3 are as follows:

The box 2 is comparatively narrow one way and extends nearly across the top of the tower the other way, and a plurality of the troughs 3 extend across the tower in the opposite direction from the length of the box. Openings 13 lead through the sides of the box to the troughs 3. The bodies of the troughs 3 are V-shaped in cross section and formed of boards 14 and 15. Notched extension boards 16 and 17 fit inside of the boards 14 and 15 and extend upwardly and outwardly and have notches 18 and 19 in their upper edges. Aprons 20 and 21 are fixed to the extension boards 16 and 17 and engage the upper edges of the boards 14 and 15 and extend outwardly and downwardly. The outer ends of the troughs 3 may be closed by end boards 22. The water fills the troughs and overflows through the notches 18 and 19 and downwardly along the outer faces of the aprons 20 and 21 and falls clear from the aprons.

Referring to Fig. 2, it will be noted that the water in pouring over the edge of the extension boards 16 and 17 through the notches 18 and 19 will fall in a thin film before striking the aprons and hence be subject to a cooling action before passing down through the rest of the cooling tower. These extension boards are subject to the hottest water and as cooling towers of this type are not continuously in use, they are subjected to alternate wetting and drying. This action causes more or less rapid deterioration to which the troughs are particularly subjected. Having the extension boards as separate elements protects the trough boards 14 and 15 from excessive drying and if any member splits from drying it is apt to be the extension boards 16 and 17 and may be readily replaced.

I claim:—

1. In an atmospheric cooling tower, distributing troughs, boards forming detachable extensions of the sides of the troughs and provided with notches and with aprons adapted to spread the water delivered therethrough.

2. In an atmospheric cooling apparatus, a V-shaped distributing element, notched boards fitting inside of the upper edges of the distributing element and detachably mounted, and aprons secured against the upper edges of the V-shaped element and extending downwardly and outwardly.

3. In an atmospheric cooling apparatus, a V-shaped distributing element, extension boards having aprons attached thereto at an angle to said boards, secured to the upper edge of the V-shaped elements, the extension boards extending upwardly above the V-shaped distributing elements and the aprons extending downwardly and outwardly, whereby the water pours over the upper edge of the extension boards and passes through the air before impinging on the aprons.

4. In an atmospheric cooling apparatus, a trough formed of boards secured together at their lower edge forming a V-shaped trough, a pair of extension boards having apron boards attached thereto, the apron boards being at substantially right angles to the extension boards, the lower edge of the extension boards fitting inside of the trough, resting on the trough boards and the aprons fitting on the upper edge of the trough boards, whereby the water pours over the upper edge of the extension boards and passes through the air before impinging on the aprons.

In testimony whereof I have signed my name to this specification.

J. SIMON FLUOR.